(12) United States Patent
Li et al.

(10) Patent No.: US 11,880,927 B2
(45) Date of Patent: Jan. 23, 2024

(54) THREE-DIMENSIONAL OBJECT RECONSTRUCTION FROM A VIDEO

(71) Applicant: NVIDIA Corporation, Santa Clara, CA (US)

(72) Inventors: Xueting Li, Sunnyvale, CA (US); Sifei Liu, Santa Clara, CA (US); Kihwan Kim, Campbell, CA (US); Shalini De Mello, San Francisco, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/320,446

(22) Filed: May 19, 2023

(65) Prior Publication Data

US 2023/0290038 A1    Sep. 14, 2023

Related U.S. Application Data

(63) Continuation of application No. 17/734,244, filed on May 2, 2022, now Pat. No. 11,704,857, which is a
(Continued)

(51) Int. Cl.
*G06T 15/04*    (2011.01)
*G06T 7/579*    (2017.01)
(Continued)

(52) U.S. Cl.
CPC ............. *G06T 15/04* (2013.01); *G06T 7/579* (2017.01); *G06T 7/70* (2017.01); *G06T 15/20* (2013.01); *G06T 17/20* (2013.01); *G06T 2207/10016* (2013.01); *G06T 2207/20084* (2013.01); *G06T 2207/30244* (2013.01)

(58) Field of Classification Search
CPC ............ G06T 15/04; G06T 7/579; G06T 7/70
See application file for complete search history.

(56) References Cited

U.S. PATENT DOCUMENTS 11,055,910 B1    7/2021    Deng et al.
2019/0108646 A1    4/2019    Wang et al.

OTHER PUBLICATIONS

Peng, X.B., et al., "Sfv: Reinforcement learning of physical skills from videos," ACM Trans. Graph., 37(6), Nov. 2018.
(Continued)

*Primary Examiner* — Matthew Salvucci
(74) *Attorney, Agent, or Firm* — Leydig, Voit & Mayer, Ltd.

(57) ABSTRACT

A three-dimensional (3D) object reconstruction neural network system learns to predict a 3D shape representation of an object from a video that includes the object. The 3D reconstruction technique may be used for content creation, such as generation of 3D characters for games, movies, and 3D printing. When 3D characters are generated from video, the content may also include motion of the character, as predicted based on the video. The 3D object construction technique exploits temporal consistency to reconstruct a dynamic 3D representation of the object from an unlabeled video. Specifically, an object in a video has a consistent shape and consistent texture across multiple frames. Texture, base shape, and part correspondence invariance constraints may be applied to fine-tune the neural network system. The reconstruction technique generalizes well—particularly for non-rigid objects.

20 Claims, 14 Drawing Sheets

Related U.S. Application Data continuation of application No. 16/945,455, filed on Jul. 31, 2020, now Pat. No. 11,354,847.

(51) Int. Cl.
  *G06T 7/70* (2017.01)
  *G06T 17/20* (2006.01)
  *G06T 15/20* (2011.01)

(56) References Cited

OTHER PUBLICATIONS

Pont-Tuset, J., et al., "The 2017 davis challenge on video object segmentation," arXiv preprint arXiv:1704.00675, 2017.
Rezende, D.J., et al., "Unsupervised learning of 3d structure from images," In NeurIPS, 2016.
Rhodin, H., et al., "General automatic human shape and motion capture using volumetric contour cues," In ECCV, 2016.
Robinette, K., et al., "Civilian American and European surface anthropometry resource (caesar) final report," Tech. Rep. AFRL-HE-WP-TR-2002-0169, US Air Force Research Laboratory, 2002.
Sorkine, O., et al., "As-rigid-as-possible surface modeling," In Symposium on Geometry processing, 2007.
Sun, Y., et al., "Test-time training for out-of-distribution generalization," arXiv preprint arXiv:1909.13231, 2019. (Abstract).
Tran, L., et al., "On learning 3d face morphable model from in-the-wild images," TPAMI, 2019.
Tung, H.Y., et al., "Self-supervised learning and motion capture," In NeurIPS, 2017.
Newcomb, et al., "DynamicFusion: Reconstruction and Tracking of Non-Rigid Scenes in Real-Time," Proceedings of the IEEE Conference on Computer Vision and Pattern Recognition (CVPR), 2015, pp. 343-352, 2015.
Wandt, B., et al., "3d Reconstruction of Human Motion from Monocular Image Sequences," TPAMI, 2016.
Wang, N., et al., "Pixel2mesh: Generating 3d mesh models from single rgb images," In ECCV, 2018.
Wen, C., et al., "Pixel2mesh++: Multi-view 3d mesh generation via deformation," In ICCV, 2019.
Wiles, O., et al., "Silnet: Single-and multi-view reconstruction by learning from silhouettes," arXiv preprint arXiv:1711.07888, 2017.
Wu, S., et al., "Unsupervised learning of probably symmetric deformable 3d objects from images in the wild," In CVPR, 2020.
Wu, Y., et al., "Group normalization," In ECCV, 2018.
Yan, X., et al., Perspective transformer nets: Learning single-view 3d object reconstruction without 3d supervision, In NeurIPS, 2016.
Zhou, X., et al., "Sparseness meets deepness: 3d human pose estimation from monocular video," In CVPR, 2016.
Zhu, R., et al., "Object-centric photometric bundle adjustment with deep shape prior," In WACV, 2018.
Zhu, Y., et al., "Complex non-rigid motion 3d reconstruction by union of subspaces," In CVPR, 2014.
Zhang, J. Y., et al. "Predicting 3d human dynamics from video." ICCV. 2019.
Kanazawa, A., et al. "Learning 3d human dynamics from video." CVPR. 2019.
Loper, M., et al. "SMPL: A skinned multi-person linear model." ACM transactions on graphics (TOG) 2015.
Lin, Chen-Hsuan, et al. "Photometric mesh optimization for video-aligned 3D object reconstruction." CVPR 2019.
Von Marcard, T., et al., "Recovering accurate 3d human pose in the wild using imus and a moving camera," In ECCV, 2018.
Biggs, B., et al. "Creatures great and SMAL: Recovering the shape and motion of animals from video," Asian Conference on Computer Vision. Springer, Cham, 2018.

He, K., et al., "Deep residual learning for image recognition," In CVPR, 2016.
Hung, W.C., et al., "Scops: Self-supervised co-part segmentation," In CVPR, 2019.
Ioffe, S., et al., "Batch normalization: Accelerating deep network training by reducing internal covariate shift," arXiv preprint arXiv:1502.03167, 2015.
Kanazawa, A., et al., "Learning category-specific mesh reconstruction from image collections," In ECCV, 2018.
Kato, H., et al., "Learning view priors for single-view 3d reconstruction," In CVPR, 2019.
Kingma, D.P., et al., "Adam: A method for stochastic optimization," arXiv preprint arXiv:1412.6980, 2014.
Li, X., et al., "Self-supervised single-view 3d reconstruction via semantic consistency," arXiv preprint arXiv:2003.06473, 2020.
Li, X., et al., "Joint-task self-supervised learning for temporal correspondence," In NeurIPS, 2019.
Liu, S., et al., "Soft rasterizer: A differentiable renderer for image-based 3d reasoning," In ICCV, 2019.
Paszke, A., et al., "Pytorch: An imperative style, high-performance deep learning library," NeurIPS, 2019.
Zuffi, S., et al., "Three-d safari: Learning to estimate zebra pose, shape and texture from images 'in the wild'," In ICCV, 2019.
Wada, K., "Labelme: Image Polygonal Annotation with Python," https://github.com/wkentaro/labelme, 2016.
Wah, C., et al., "The caltech-ucsd birds-200-2011 dataset," 2011.
Zhang, R., et al., "The unreasonable effectiveness of deep features as a perceptual metric," In CVPR, 2018.
Zuffi, S., et al., "3D menagerie: Modeling the 3D shape and pose of animals," In CVPR, 2017.
Arnab, A., et al., "Exploiting temporal context for 3D human pose estimation in the wild," In CVPR, Jun. 2019.
Bregler, C., et al., "Recovering non-rigid 3D shape image streams," in CVPR, 2000.
Chen, L.C., et al., "Deeplab: Semantic image segmentation with deep convolutional nets, atrous convolution, and fully connected crfs," TPAMI, 2017.
Choy, C.B., et al., "3D-r2n2: A unified approach for single and multi-view 3D object reconstruction," In ECCV, 2016.
Doersch, C., et al., "Sim2real transfer learning for 3D human pose estimation: motion to the rescue," In NeurIPS, 2019.
Feng, Y., et al., "Joint 3D face reconstruction and dense alignment with position map regression network," In ECCV, 2018.
Guo, P., et al., "Aligned to the object, not to the image: A unified pose-aligned representation for fine-grained recognition," In ICCV, 2019.
Habermann, M., et al., "Deepcap: Monocular human performance capture using weak supervision," In CVPR, 2020.
Henderson, P., et al., "Learning to generate and reconstruct 3D meshes with only 2D supervision," In BMVC, 2018.
Kato, H., et al., "Self-supervised learning of 3D objects from natural images," arXiv preprint arXiv:1911.08850, 2019.
Kato, H., et al., "Neural 3D mesh renderer," In CVPR, 2018.
Khoreva, A., et al., "Video object segmentation with language referring expressions," In ACCV, 2018.
Kong, C., et al., "Deep non-rigid structure from motion," In ICCV, 2019.
Kulkarni, N., et al., "Canonical surface mapping via geometric cycle consistency," In ICCV, 2019.
Lin, C.H., et al., "Photometric mesh optimization for video-aligned 3D object reconstruction," In CVPR, 2019.
Luo, X., et al., "Consistent video depth estimation," ACM Transaction on Graphics (Proceedings of ACM SIGGRAPH), 39(4), 2020.
Novotny, D., et al., "C3dpo: Canonical 3d pose networks for non-rigid structure from motion," In ICCV, 2019.
Pan, J., et al., "Deep mesh reconstruction from single rgb images via topology modification networks," In ICCV, 2019.
Pavllo, D., et al., "3d human pose estimation in video with temporal convolutions and semi-supervised training," In CVPR, 2019.

THREE-DIMENSIONAL OBJECT RECONSTRUCTION FROM A VIDEO

CLAIM OF PRIORITY

This application is a continuation of U.S. patent application Ser. No. 17/734,244 titled "Three-Dimensional Object Reconstruction from a Video," filed May 2, 2022 which is a continuation of U.S. patent application Ser. No. 16/945,455 titled "Three-Dimensional Object Reconstruction from a Video," filed Jul. 31, 2020, the entire contents of both applications are incorporated herein by reference.

TECHNICAL FIELD

The present invention relates to three-dimensional (3D) object reconstruction, and in particular, to a technique for constructing a 3D object from a video.

BACKGROUND

When we humans try to understand an image of an object, such as a duck, we instantly recognize a "duck". We also instantly perceive and imagine the shape of the duck in the 3D world the duck's appearance from other viewpoints. Furthermore, when we see the duck in a video, its 3D structure and deformation become even more apparent to us. Our ability to perceive the 3D structure of objects contributes vitally to our rich understanding of them.

While 3D perception is easy for humans, 3D reconstruction of deformable objects remains a very challenging problem in computer vision, especially for objects in the wild. For learning-based algorithms, a bottleneck is the lack of supervision available for training. It is challenging to collect 3D annotations, such as 3D shape and camera pose, without limiting the domain (e.g., rigid objects, human bodies, and faces) for which 3D annotations can be captured in constrained environments. However, conventional approaches in the limited domains do not generalize well to non-rigid objects captured in naturalistic environments (e.g., animals). Due to constrained environments and limited annotations, it is very difficult to generalize the conventional approaches to the 3D construction of non-rigid objects (e.g., animals) from images and videos captured in the wild. There is a need for addressing these issues and/or other issues associated with the prior art.

SUMMARY

A 3D object reconstruction neural network system learns to predict a 3D representation of an object from a video that includes the object. An object in a video maintains temporal consistency, having a consistent shape and consistent texture across multiple frames. The temporal consistency of the object is exploited to reconstruct a dynamic 3D representation of the object from an unlabeled video. Texture, identity shape, and part correspondence invariance constraints may be applied to fine-tune the neural network system. The reconstruction technique generalizes well, particularly for non-rigid objects and the neural network system can inference in real time.

A method, computer readable medium, and system are disclosed for constructing a 3D representation of an object from a video. In an embodiment, a neural network model receives a video including images of the object captured from a camera pose and predicts a 3D shape representation of the object for a first image of the images based on a set of learned shape bases. The neural network model also predicts a texture flow for the first image and maps pixels from the first image to a texture space according to the texture flow to produce a texture image, where transfer of the texture image onto the 3D shape representation constructs a 3D object corresponding to the object in the first image.

BRIEF DESCRIPTION OF THE DRAWINGS

The present systems and methods for three-dimensional (3D) object reconstruction from a video are described in detail below with reference to the attached drawing figures, wherein.

DETAILED DESCRIPTION

The task of 3D reconstruction entails the simultaneous recovery of the 3D shape, texture, and camera pose of objects from 2D images. The task is highly ill-posed due to the inherent ambiguity of correctly estimating both the shape and camera pose together. However, a 3D object construction neural network system may learn to predict 3D representations of the object from video.

In an embodiment, the 3D object construction neural network system is trained to reconstruct temporally consistent 3D meshes of deformable object instances from videos. In an embodiment, the videos include real animals in natural environments. Prior to inferencing, the neural network system is trained to jointly predict the shape, texture, and camera pose of an image for category-specific 3D reconstruction using a collection of single-view images of the same category. A first example category may include, but is not limited to, birds (including ducks). A second example category may be horses. In general, a category includes animals that have a similar structure, such as animals within a single species. The neural network may be trained without requiring an annotated 3D mesh, 2D keypoints, or camera pose for each video frame.

Then, at inference time, the neural network system is adapted over time using self-supervised regularization terms that exploit temporal consistency of an object instance to enforce that all reconstructed meshes for the object share a common texture map, a base (identity) shape, as well as parts. As a result of the adaptive refinement, the neural network system recovers temporally consistent and reliable 3D structures from videos of non-rigid objects including those of animals captured in the wild—a challenging task that is rarely addressed.

Figure 1A:
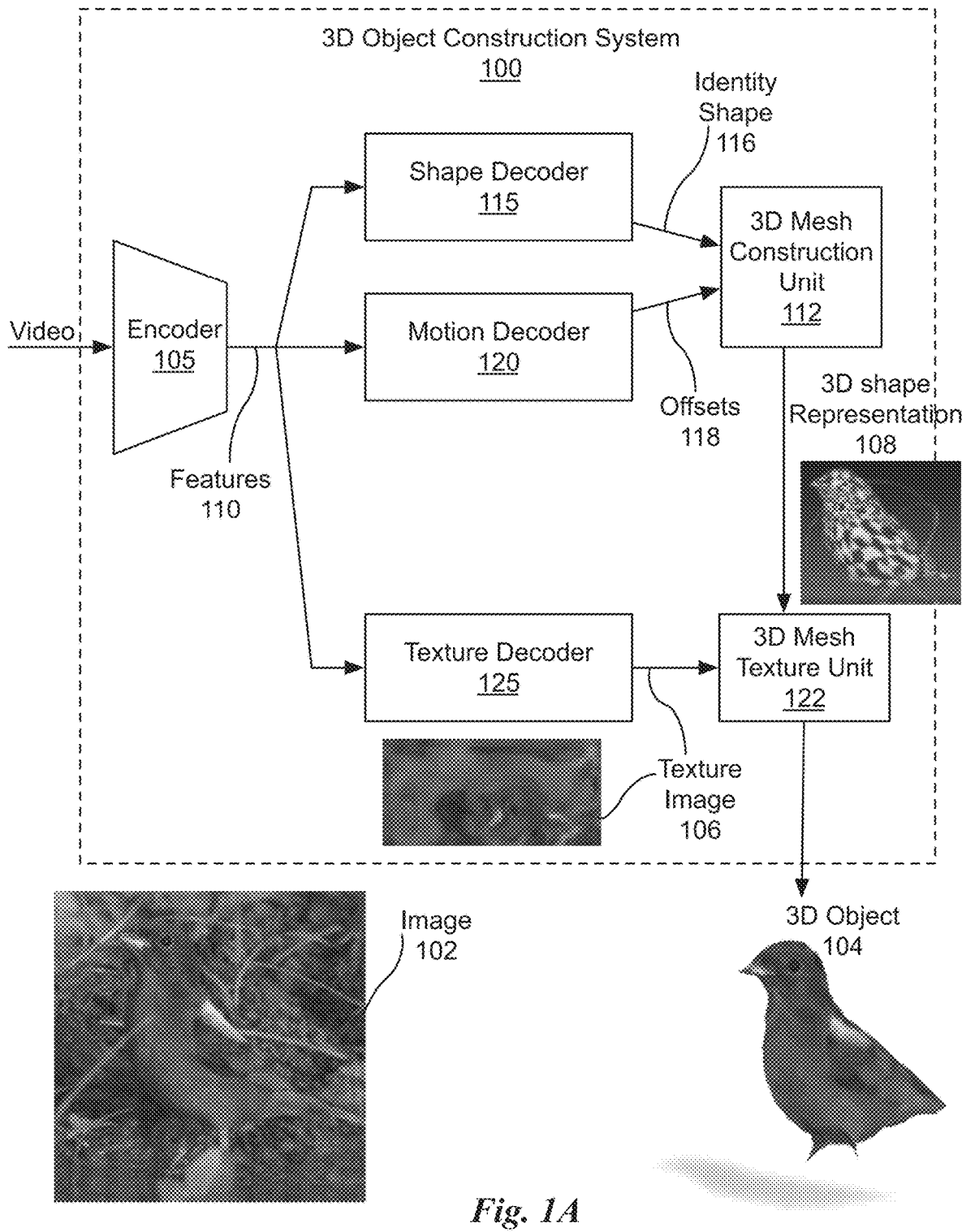
FIG. 1A illustrates a block diagram of an example 3D object reconstruction system suitable for use in implementing some embodiments of the present disclosure.

FIG. 1A illustrates a block diagram of a 3D object construction system 100, in accordance with an embodiment. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the 3D object construction system 100 is within the scope and spirit of embodiments of the present invention.

The 3D object construction system 100 includes a neural network model comprising at least an encoder 105, shape decoder 115, and motion decoder 120. The encoder 105 extracts features 110 from each frame (e.g., image) in the video. An input image 102 including an object and a predicted 3D object 104, output by the 3D object construction system 100, are illustrated in FIG. 1A. The features 110 are then processed by a variety of decoders to predict an identity shape, motion (offsets), texture, and camera (not shown). In an embodiment, the shape decoder 115 outputs an identity shape 116 that represents basic shapes of the same category (e.g., duck, flying bird, fat bird, standing bird, etc.). In an embodiment, the identity shape 116 is defined by a 3D mesh of vertices that define faces of the mesh surface. In an embodiment, the meshes for a particular category are deformed from a predefined sphere and have the same number of vertices/faces. The motion decoder 120 predicts offsets, V/V relative to each vertex in the identity shape 116. For each video frame, the offsets define shape deformations that are applied to the identity shape 116 and, over time, appear as movement.

In contrast with conventional 3D reconstruction techniques, the predicted shapes are not limited to those that are symmetric. An assumption of symmetry does not hold for most non-rigid animals, e.g., birds tilting their heads, or walking horses, etc. This is particularly important for recovering dynamic meshes in sequences, e.g., when a bird rotates its head, the 3D shape is no longer mirror symmetric. Therefore, the assumption of symmetry may be removed and the constructed meshes are allowed to fit more complex, non-rigid poses. Simply removing the symmetry assumption for the predicted vertex offsets leads to excessive freedom in shape deformation. To resolve undesirable deformations, a set of $N_b$ shape bases $\{V_i\}_{i=1}^{N_b}$ is learned by the shape decoder 115 based on the features 110. The base or identity shape 116 is computed as a weighted combination of the shape bases, denoted as the base shape $V_{base}$. Compared to a single mesh template, the base shape $V_{base}$ is more powerful in capturing the object's identity and relieves the shape decoder 115 from predicting large motion deformation, e.g., of deforming a standing bird template to a flying bird.

Different sets of shape bases are learned during training by clustering constructed meshes, where the meshes in each set share a similar shape and the base shape is their mean shape. Learned coefficients $\{\beta_i\}_{i=1}^{N_b}$ are predicted by the shape decoder 115 and used to combine corresponding meshes in the set of shape bases to produce the identity shape 116. The identity shape 116 may be computed as:

$$V_{base} = \Sigma_{i=1}^{N_b} \beta_i V_i \qquad \text{Eq. (1)}$$

The motion decoder 120 predicts offsets ∇V relative to each vertex in the identity shape 116. The offsets 118 encode the object's asymmetric non-rigid motion, defining deformations for each vertex in the identity shape 116.

$$V = V_{base} + \nabla V. \qquad \text{Eq. (2)}$$

The offsets 118 are applied to the vertices of the identity shape 116 by 3D mesh construction unit 112 to construct a predicted 3D shape representation 108 (e.g., wireframe or mesh) of the object. The predicted 3D shape representation 108 is shown as a checkerboard in FIG. 1A for visualization purposes, where different faces defined by the vertices in the mesh are colored either black or white.

The texture decoder 125 receives the features 110 and predicts a texture image 106 for each frame of the video. The texture decoder 125 predicts a texture flow $I_{flow} \in \mathbb{R}^{H_{uv} \times W_{uv} \times 2}$ for each image based on the features 110. The texture flow maps pixels from the image to UV texture space to produce a texture image 106. A predefined UV mapping function may then be used by 3D mesh texture unit 122 to map the texture image 106 from the texture space to the 3D shape representation 108. Applying the texture image 106 to the 3D shape representation 108 produces a 3D object 104 (e.g., textured mesh). The 3D object 104 is represented with |V| vertices ($V \in \mathbb{R}^{|V| \times 3}$), |F| faces ($F \in \mathbb{R}^{|F| \times 3}$), and the UV texture image $I_{uv} \in \mathbb{R}^{H_{uv} \times W_{uv} \times 3}$ of height $H_{uv}$ and width $W_{uv}$. The UV texture space provides a parameterization that is invariant to object deformation. Therefore, over time, the image texture for the images in the video should be constant or invariant to shape deformation.

By enforcing the predicted values for the texture images 106 to be consistent in the UV texture space across different frames of a video, the neural network model can be regularized to generate coherent reconstructions over time during inferencing. The temporal invariance may be used as self-supervised signals to tune the neural network model. In an embodiment, during inferencing, the 3D object construction system 100 is adapted using self-supervised regularization based on shape invariance and texture invariance. Specifically, an object in a video maintains a consistent shape and consistent texture across multiple frames. The self-supervised adaptation technique exploits the temporal consistency of the object to construct the dynamic 3D object from an unlabeled video. As described further herein, texture image, identity shape, and part correspondence invariance constraints may be applied to train and/or fine-tune the neural network model.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
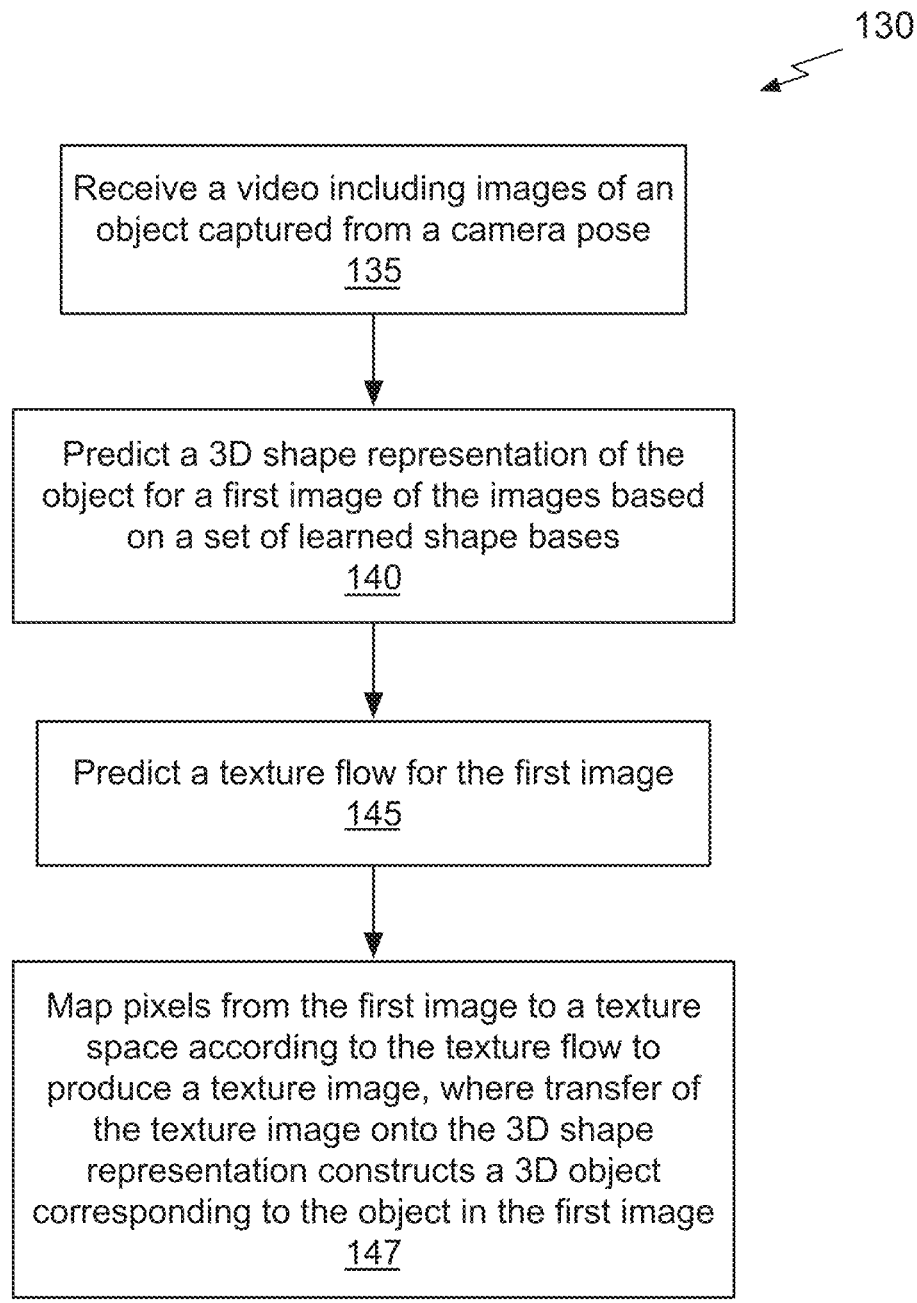
FIG. 1B illustrates flowchart of a method for reconstructing a 3D representation of an object using the system shown in FIG. 1A suitable for use in implementing some embodiments of the present disclosure.

FIG. 1B illustrates flowchart of a method 130 for constructing a 3D representation of an object using the 3D object reconstruction system 100 shown in FIG. 1A, in accordance with an embodiment. Each block of method 130, described herein, comprises a computing process that may be performed using any combination of hardware, firmware, and/or software. For instance, various functions may be carried out by a processor executing instructions stored in memory. The method 130 may also be embodied as computer-usable instructions stored on computer storage media. The method 130 may be provided by a standalone application, a service or hosted service (standalone or in combination with another hosted service), or a plug-in to another product, to name a few. In addition, method 130 is described, by way of example, with respect to the system of FIG. 1A. However, this method may additionally or alternatively be executed by any one system, or any combination of systems, including, but not limited to, those described herein. Furthermore, persons of ordinary skill in the art will understand that any system that performs method 130 is within the scope and spirit of embodiments of the present invention.

At step 135, the 3D object construction system 100 receives a video including images of the object captured from a camera pose. In an embodiment, the video is unlabeled. In an embodiment, the object is a non-rigid animal. In an embodiment, the video is captured in the "wild".

At step 140, the 3D object construction system 100 predicts the 3D shape representation of the object for a first image of the images based on a set of learned shape bases. In an embodiment, the 3D object construction system 100 predicts an identity shape from a set of learned shapes. In an embodiment, the identity shape is computed using Equation (1). In an embodiment, the identity shape is computed as a sum of component shapes included in the set of learned shape bases and each component shape is corresponding scaled by a coefficient generated by the neural network model. In an embodiment, shape offsets (e.g., non-rigid motion deformations) are computed and applied to the vertices of the identity shape to predict the 3D shape representation of the object. In an embodiment, the 3D shape representation is a mesh of vertices that define faces.

At step 145, the 3D object construction system 100 predicts a texture flow for the first image. At step 147, the 3D object construction system 100 maps pixels from the first image to a texture space according to the texture flow to produce a texture image corresponding to the first image. In an embodiment, for a particular image, the texture image is transferred onto the 3D shape representation to produce the 3D object corresponding to the object in the first image. In an embodiment, steps 140, 145, and 147 are repeated for each image in the video. In an embodiment, the 3D construction system 100 also predicts a camera pose based on features extracted from the video. When the 3D object is rendered according to the camera pose for each frame of video, the rendered object appears as the object in the frame.

Figure 1C:
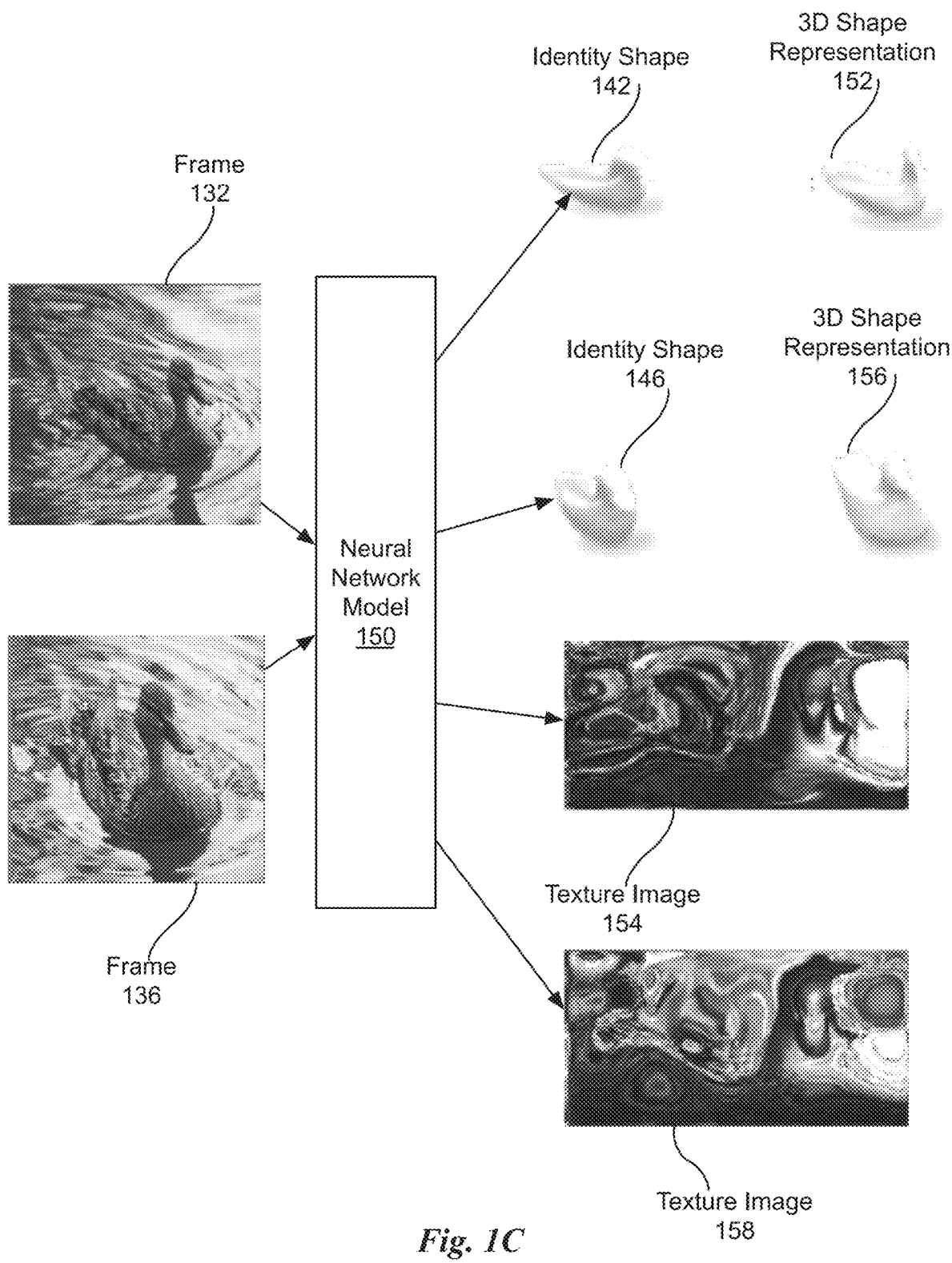
FIG. 1C illustrates a conceptual diagram of temporal consistency constraints, in accordance with an embodiment.

FIG. 1C illustrates a conceptual diagram of temporal consistency constraints, in accordance with an embodiment. A neural network model 150 comprises the encoder 105, shape decoder 115, and texture decoder 125. In an embodiment, to enforce texture invariance, the reconstructed texture images for an arbitrary pair of frames (e.g., images) in a video sequence are swapped. As shown in FIG. 1C, frames 132 and 136 are processed by the neural network model 150 to predict the respective identity shapes 142 and 146. The identity shapes 142 and 146 shown in FIG. 1C are each posed according to a respective camera pose, θ of the respective frames, where $\theta \in \mathbb{R}^7$. In an embodiment, the camera pose represents a perspective transformation. Except for the different camera poses, the identity shapes 142 and 146 are the same. The offsets predicted by the neural network model 150 for the frames 132 and 136 are applied to the respective identity shapes 142 and 146, to produce 3D shape representations 152 and 156.

The shape model is represented by an identity or base shape $V_{base}$ and an offset or deformation term $\Delta V$, in which the identity shape $V_{base}$ intuitively corresponds to the "identity" of the instance, e.g., a duck, or a flying bird, etc. During online adaptation, the neural network model 150 is trained to predict consistent $V_{base}$ to preserve the identity shape over time, via a swapping loss function. Given two randomly sampled frames, $I^i$ and $I^j$, the identity shapes $V_{base}^i$ and $V_{base}^j$ are swapped and deformed using the original offsets $\Delta V^i$ and $\Delta V^j$ as:

$$L_s = \text{niou}(\mathcal{R}(V_{base}^j + \Delta V^i, \theta^i), S^i) + \text{niou}(\mathcal{R}(V_{base}^i + \Delta V^j, \theta^j), S^j), \quad \text{Eq. (3)}$$

where $\theta^i$ and $\theta^j$ are the camera poses, $\Delta V^i$ and $\Delta V^j$ are the motion deformations, and $S^i$ and $S^j$ are the object silhouettes (masks) of frame i and j, respectively. $\mathcal{R}(\bullet)$ denotes a general projection. In an embodiment, $\mathcal{R}(\bullet)$ represents a differentiable renderer to render the 3D representation or 3D object to a 2D silhouette as $\mathcal{R}(V, \theta)$. In an embodiment, $\mathcal{R}(\bullet)$ represents a differentiable renderer to render a texture mesh to an RGB image as $\mathcal{R}(V, \theta, I_{uv})$ (note that mesh faces F are omitted for conciseness). In an embodiment, $\mathcal{R}(\bullet)$ represents a projection of a 3D point v to the image space as $\mathcal{R}(v, \theta)$. The niou($\bullet, \bullet$) denotes the negative intersection over union (IoU) objective. In an embodiment, the foreground masks used for the silhouette are obtained by a segmentation model trained with the ground truth foreground masks. The loss function $L_s$ may be used to enforce consistency between the identity shapes 142 and 146.

The neural network model 150 also predicts the texture images 154 and 158 for the frames 132 and 136, respectively. Based on the observation that object texture mapped to the UV space should be invariant to shape deformation and stay constant over time, a texture invariance constraint maybe used to encourage consistent texture reconstruction from all frames. However, naively aggregating the UV texture maps from all the frames may lead to a blurry video-level texture image. Instead, like the shape identity, texture consistency may be enforced between random pairs of frames, via a swap loss. Given two randomly sampled frames, $I^i$ and $I^j$, the texture images $I_{uv}^i$ and $I_{uv}^j$ are swapped and combined with the original mesh reconstructions $V^i$ and $V^j$ as:

$$L_t = \text{dist}(\mathcal{R}(V^i, \theta^i, I_{uv}^j) \odot S^i, I^i \odot S^i) + \text{dist}(\mathcal{R}(V^j, \theta^j, I_{uv}^i) \odot S^j, I^j \odot S^j),$$ Eq. (4)

where dist(•,•) is a perceptual metric. The swapping technique enforces consistency of the texture images across the frames, thereby improving the accuracy of the predicted texture images 106, 3D shape representations 108, and 3D objects 104 in FIG. 1A. For example, the loss function $L_t$ may be used to enforce consistency between the texture images 154 and 158. During inferencing, the neural network model 150 may be fine-tuned on a particular video with the invariance constraints enforced by Equations (3) and (4). In an embodiment, the neural network model 150 is fine-tuned using self-supervision. Fine-tuning may improve the performance of the neural network model 150 when domain differences in video quality, such as lighting conditions, etc. cause inconsistent 3D mesh reconstruction as each frame of a video is processed independently.

Figure 1D:
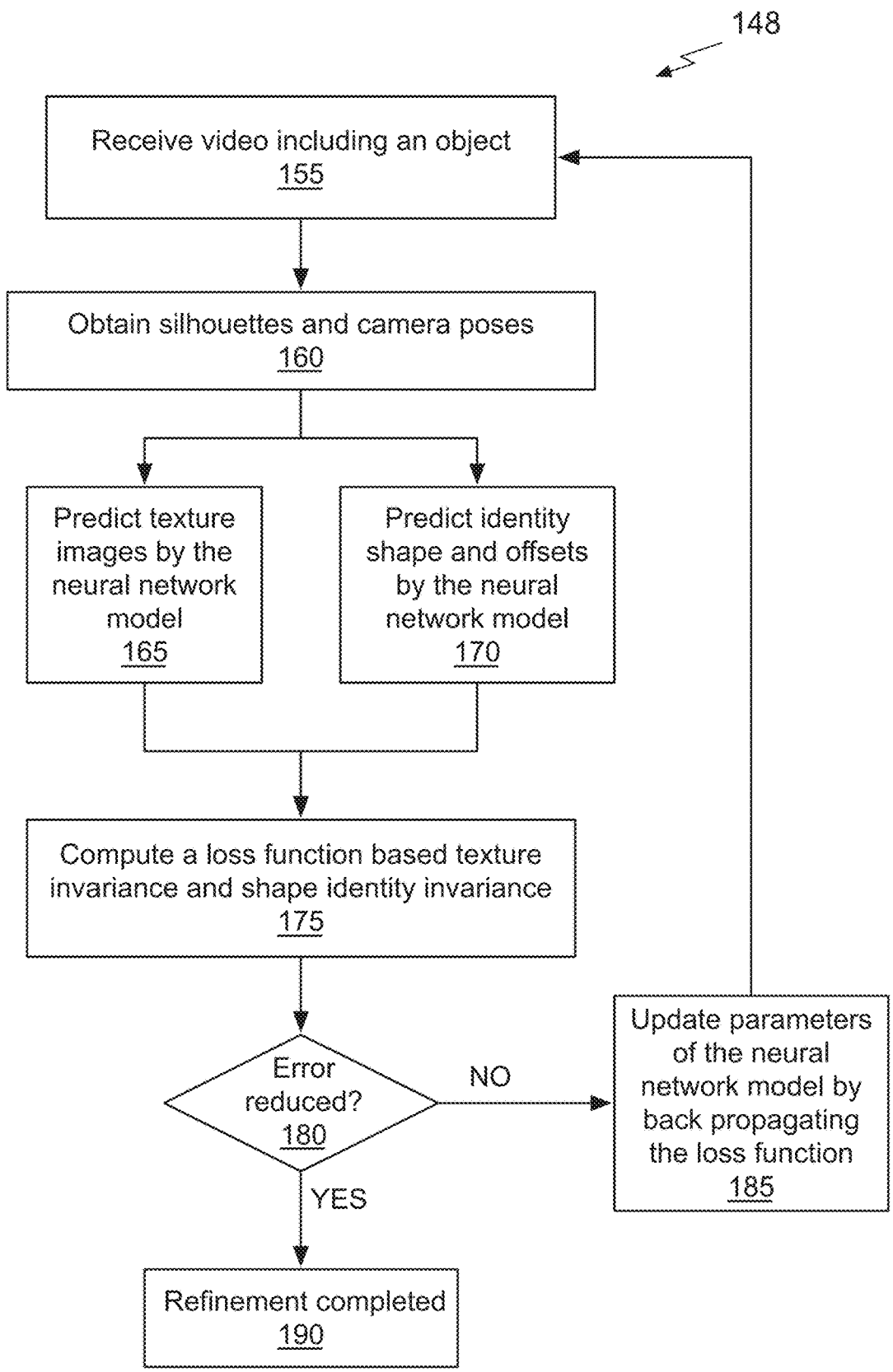
FIG. 1D illustrates a flowchart of a method for applying self-supervised adaptation to the system shown in FIG. 1A suitable for use in implementing some embodiments of the present disclosure.

FIG. 1D illustrates a flowchart of a method 148 for applying self-supervised adaptation to the system shown in FIG. 1A, in accordance with an embodiment. The neural network model 150 is refined by taking advantage of the redundancy in temporal sequences as a form of self-supervision in order to improve the construction of dynamic non-rigid objects. Although method 148 is described in the context of a neural network model, the method 148 may also be performed by a program, custom circuitry, or by a combination of custom circuitry and a program. For example, the method 148 may be executed by a GPU, CPU, or any processor capable of implementing the neural network model. Furthermore, persons of ordinary skill in the art will understand that any system that performs method 148 is within the scope and spirit of embodiments of the present invention.

At step 155, the neural network model 150 receives a sequence of frames for a video including an object. At step 160, silhouettes and camera poses are obtained. In an embodiment, the silhouettes are ground truth data corresponding to the video. In an embodiment, the camera poses are predicted by the neural network model 150. Steps 165 and 170 may be performed in parallel or in sequence. At step 165, texture images are predicted for each frame by the neural network model 150. At step 170, an identity shape and offsets are predicted for each frame by the neural network model 150.

At step 175, a loss function is computed based on texture invariance and shape identity invariance. In an embodiment, the loss function is a swapping loss function. In an embodiment, the loss function is a combination of Equations (3) and (4).

At step 180, if the error is reduced according to the loss function, then at step 190, refinement of the neural network model 150 is completed. Otherwise, at step 185, parameters of the neural network model 150 are updated by back propagating the loss function before the method 148 returns to step 155. In an embodiment, parameters of one or more of the shape decoder 115, motion decoder 120, and texture decoder 125 are updated.

In an embodiment, the texture image predicted for a first image is transferred to a second 3D shape representation predicted for a second image of the images in a video to produce a first 3D object. The first 3D object is projected according to a first camera pose associated with the first image to produce a first projected 3D object. A second texture image predicted for the second image is transferred to the 3D shape representation predicted for the first image to produce a second 3D object. The second 3D object is projected, according to a second camera pose associated with the second image, to produce a second projected 3D object and parameters of the neural network model 150 are updated to encourage consistency between the first projected 3D object and the second projected 3D object. In an embodiment, differences between overlapped parts of the first and second image are reduced during training.

In an embodiment, first non-rigid motion deformations predicted for the first image are applied to a first identity shape predicted for a second image of the images to produce a first 3D shape representation. The first 3D shape representation is projected according to a first camera pose associated with the first image to produce a first projected 3D object. Second non-ridge motion deformations predicted for the second image are applied to a second identity shape predicted for the first image to produce a second 3D shape representation. The second 3D shape representation is projected according to a second camera pose associated with the second image to produce a second projected 3D object and parameters of the neural network model 150 are updated to encourage consistency between the first projected 3D object and the second projected 3D object.

Figure 2A:
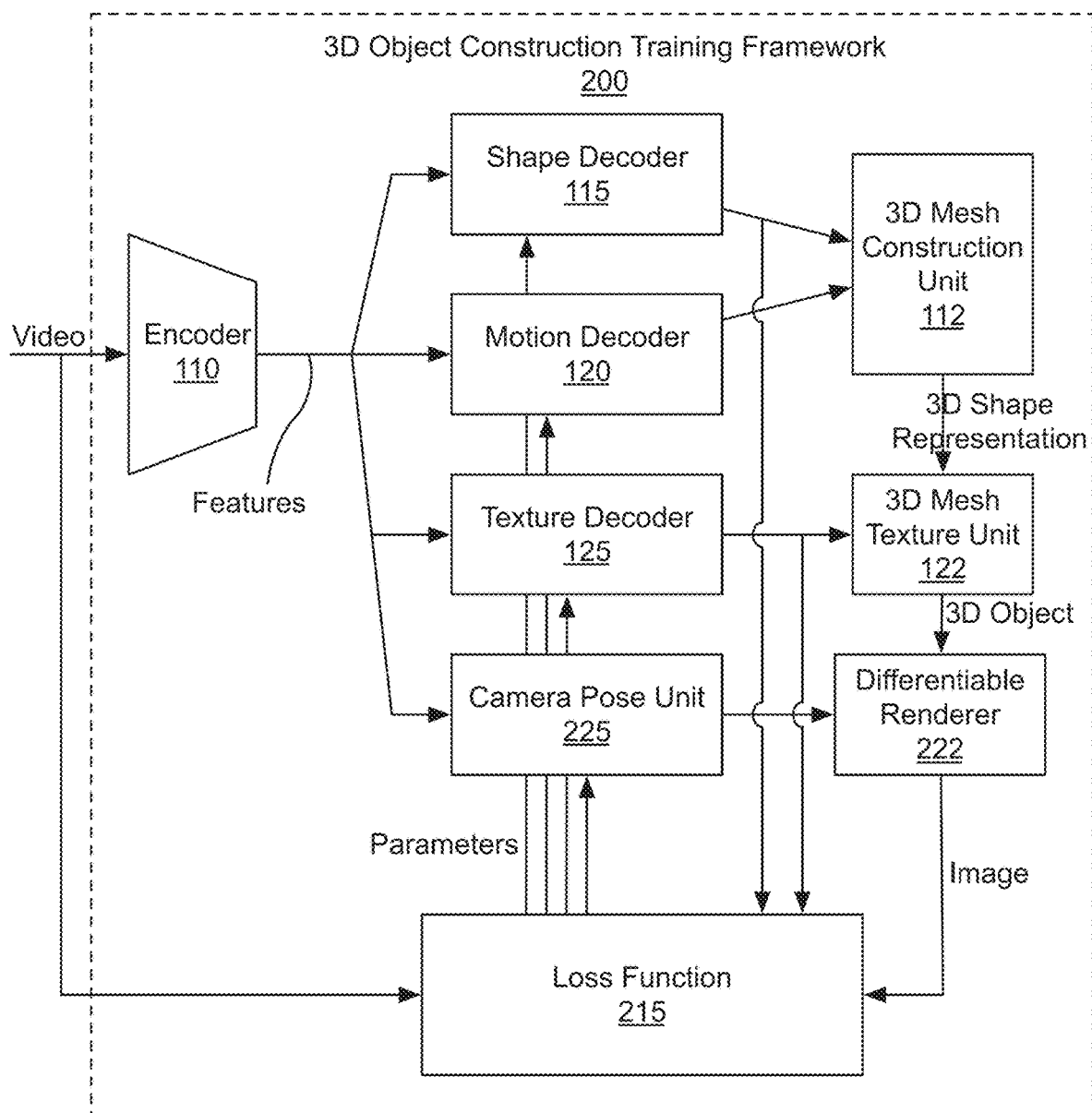
FIG. 2A illustrates a block diagram of an example training configuration for the 3D object construction system shown in FIG. 1A suitable for use in implementing some embodiments of the present disclosure.

FIG. 2A illustrates a block diagram of a training configuration for the 3D object construction system 100 shown in FIG. 1A, in accordance with an embodiment. In addition to the blocks shown in FIG. 1A, the training framework includes a camera pose unit 225, a differentiable renderer 222, and a loss function 215. In an embodiment, the camera pose unit 225 is also included in the neural network model 150 and/or the 3D object construction system 100. The camera pose unit 225 receives the features and predicts a camera pose (position and orientation), $\theta$ of the identity shape based on the features. The shape decoder 115, motion decoder 120, texture decoder 125, and camera pose unit 225 may be configured to jointly predict the identity shape, offsets, texture image, and camera pose.

The differentiable renderer 222 receives the 3D mesh and texture image and renders the 3D mesh according to the predicted camera pose provided by the camera pose unit 225. In an embodiment, the texture image is transferred onto the 3D shape representation by the 3D mesh texture unit 122 to construct the 3D object. The textured 3D object is then projected by the differentiable renderer 222 according to the camera pose to produce a rendered image.

Rendered images may be compared with the video frames and/or annotations during training. The loss function 215 may adjust parameters of the shape decoder 115, motion decoder 120, texture decoder 125, and/or camera pose unit 225 to reduce differences between the rendered images and video frames. In some embodiments, the loss function 215 receives ground truth data, such as object silhouettes and/or keypoint annotations, that are used to reduce differences between the rendered images and video frames. In an embodiment, training is accomplished in a self-supervised manner using object silhouettes extracted from category-specific images. The training configuration may be used to train the 3D object construction system 100 using both individual input images and videos. In an embodiment, training may be performed using a variety of techniques, e.g., supervised, self-supervised, and semi-supervised using individual images and/or videos. For example, the 3D object construction system 100 may be trained to learn sets of shape bases using semi-supervised techniques with single-view input images, followed by fine-tuning via self-supervised techniques using an unlabeled video of a specific object.

Conventional techniques use annotated 2D object keypoints and category-level template shapes or silhouettes for training. However, scaling up learning with 2D annotations to hundreds of thousands of images is non-trivial and may also limit the generalization ability of a trained neural network model for new domains. For example, a 3D construction neural network model that is conventionally trained on single-view images typically produces unstable and erratic predictions for video data. This is unsurprising, due to perturbations over time. Therefore, the temporal signal in videos should be used to provide an advantage instead of a disadvantage.

A balance may be achieved between model generalization and specialization. In an embodiment, an image-based neural network model is trained on a set of images, while at test time, the neural network model within the 3D object construction system 100 is adapted or fine-tuned to an input video including a particular identity object. During test-time training no labels are provided for the video. Therefore, self-supervised objectives are introduced that can continuously improve the neural network model. As previously described, the UV texture space provides a parameterization that is invariant to object deformation. Object parts of an instance of an object should be constant when mapped from 2D via the predicted texture flow. Therefore, in addition to encouraging temporal consistency between the texture images and identity shapes predicted for different frames, temporal consistency may be encouraged between object parts in UV texture space. In particular, invariance loss may be used to train the camera pose unit 225 to predict the camera position θ. Using the constraint of temporal consistency, the recovered identity shape and camera pose may be stabilized considerably and adapted based on the video that is processed during fine-tuning and/or test time.

Figure 2B:
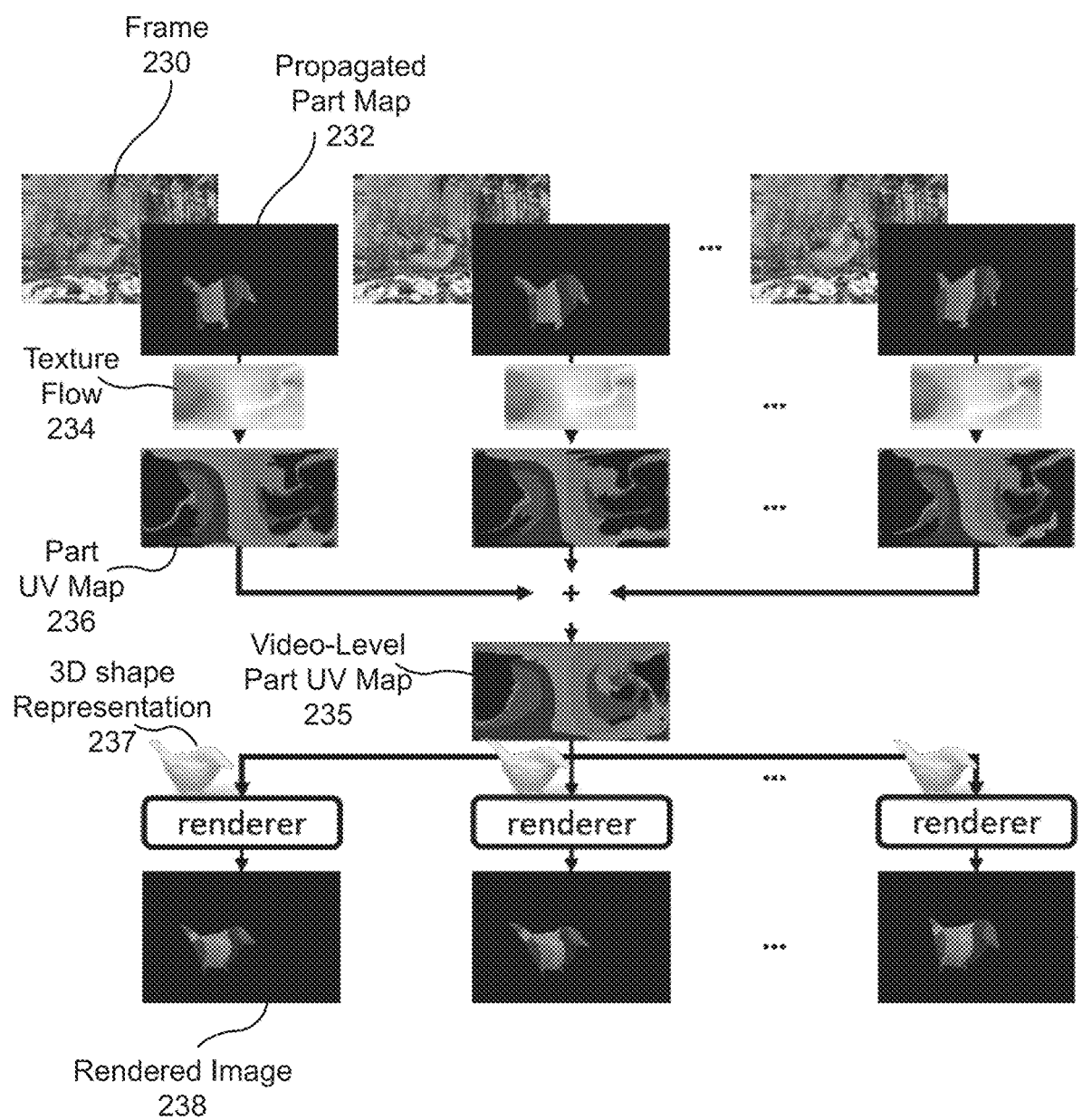
FIG. 2B illustrates a conceptual diagram of using temporal invariance to encourage parts correspondence, in accordance with an embodiment.

FIG. 2B illustrates a conceptual diagram of using temporal invariance to enforce parts correspondence, in accordance with an embodiment. The video includes a bird object that the 3D object construction system 100 may be trained to construct. Conventional techniques, such as unsupervised video correspondence (UVC) may be used to automatically apply (random) patterns to parts of the object in input video frames to generate a propagated part map for each frame. The UVC model learns an affinity matrix that captures pixel-level correspondences among video frames. The UVC model can be used to propagate any annotation (e.g, segmentation labels, keypoints, part labels, etc.), from an annotated keyframe to the other unannotated frames. Part correspondence is generated within a video clip by "painting" a group of random regions on the object on the first frame and propagating the part painting to the rest of the video using the UVC model. Any specific part of the object, such as a wing may be painted as a single region or as multiple regions. In other words, the painting does not provide a semantic definition. As shown in FIG. 2B, the painting appears as differently colored vertical stripes within a silhouette of the object visible in a propagated part map 232.

In an embodiment, to obtain accurate part propagation of object parts by the UVC model, two strategies may be employed. Firstly, parameters in the 3D object construction system 100 may be fine-tuned on sliding windows instead of all video frames. Each sliding window may include $N_w$=50 consecutive frames and the sliding stride is set to $N_s$=10. The 3D object construction system 100 may be tuned for $N_t$=40 iterations with frames in each sliding window. Secondly, instead of "painting" random parts onto the first frame and propagating the painted parts to rest of the frames sequentially in a window, random parts may be painted onto the middle frame (i.e. the $N_w/2^{th}$ frame) in the window and the painted parts may be propagated backward to the first frame as well as forward to the last frame in the window. The strategy may improve the propagation quality by decreasing the propagation range to half of the window size. Within each sliding window, consistency of the UV texture images, part UV maps, as well as identity shapes is encouraged for all of the frames.

A sequence of propagated part maps associated with video frames, such as the propagated part map 232 associated with the frame 230 is processed by the 3D object construction system 100 in a test configuration. The processing of the propagated part map 232 is described, however, additional propagated part maps shown in FIG. 2B or additional frames in the sequence may be processed in a similar manner to produce additional rendered images. In an embodiment, the part map is propagated across the object in a number of the frames to produce propagated part maps. In an embodiment the number of frames is included in a sliding window.

The propagated part map for each frame is mapped to the UV texture space with the predicted texture flow 234 to produce part UV map 236. In an embodiment, the propagated part maps are mapped into the texture space according to corresponding texture flows predicted for the frames to produce part maps in the texture space. In an embodiment, the part maps are aggregated to produce a video level part UV map 235. By aggregating the part UV maps, i.e., averaging, noise is minimized in each individual part UV map. The video-level part UV map 235 for the object depicted in the video that will be constructed in 3D is shared by all frames in the video. Thus, for each frame, the video-level part UV map 235 is wrapped onto the predicted 3D shape representation 237. Aggregation of the predicted parts in the UV texture space facilitates learning the camera pose by the 3D object construction system 100.

In an embodiment, 3D shape representations predicted for the frames are rendered according to the associated camera poses (not shown) and the video-level part map is transferred (e.g., wrapped) onto each one of the 3D shape representations to produce rendered images. The wrapped 3D shape representation 237 may be rendered by the differentiable renderer 222 according to the predicted camera to produce rendered image 238.

Discrepancies between the parts rendered back to the 2D space and the part propagations, for each frame, are penalized. In an embodiment, the loss function 215 may be configured to update parameters of the neural network model 150 based on the discrepancies. In an embodiment, the parameters are updated to encourage consistency between the rendered images and the propagated part maps.

As the propagated part maps are usually temporally smooth and continuous, the loss implicitly regularizes the 3D object construction system 100 to predict coherent camera pose and object shape over time. In an embodiment, instead of minimizing the discrepancy between the rendered part map (e.g., rendered image, such as the rendered image 238) and the propagated part map of a frame, it may be more robust to penalize the geometric distance between the projections of vertices assigned to each part with 2D points sampled from the corresponding part. A Chamfer loss may be computed as:

$$L_c = \sum_{j=1}^{N_f} \sum_{i=1}^{N_p} \frac{1}{|V_i^j|} \text{Chamfer}(\mathcal{R}(V_i^j, \theta^j), Y_i^j), \quad \text{Eq. (5)}$$

where $N_f$ is the number of frames in the video, $N_p=6$ is the number of parts, and $V_i^j$ are vertices assigned to part i. The Chamfer distance is used to compute the loss because the vertex projections $\mathcal{R}(V_i^j, \theta^j)$ are not strictly one-to-one corresponded to the sampled 2D points $Y_i^j$.

The input samples of the propagated part maps are compared with the projected samples of the images rendered based on the predicted video-level part UV map, 3D representation, and camera pose to calculate the Chamfer loss. The Chamfer loss reduces errors from the camera pose estimation. Alternatively, more samples (e.g., pixels) within the colored parts of the propagated part map 232 may be used as the ground truth and the predicted 3D shape representation 237 may be wrapped with the video-level part UV map 235 and rendered according to the camera pose to produce a rendered image 238 for comparison with the ground truth colored samples.

In an embodiment, the colored parts are used to supervise the estimated camera pose without rendering images. The input video frames may be sampled within each part of the part propagations and then compared with the predicted samples on the 3D representations (e.g., meshes) projected according to the predicted camera pose (no rendering).

Another technique for training uses propagation of the ground truth annotations, such as keypoints, from the input images through the predicted texture images to the rendered images. A loss may be computed based on the ground truth annotations and the rendered annotations. The ground truth annotations enable correspondences to be established across different instances in a set of shape bases. For example, a beak or wingtip is labeled as a keypoint in different images of birds and different birds with similar shapes are clustered together to form a set of shape bases.

Figure 2C:
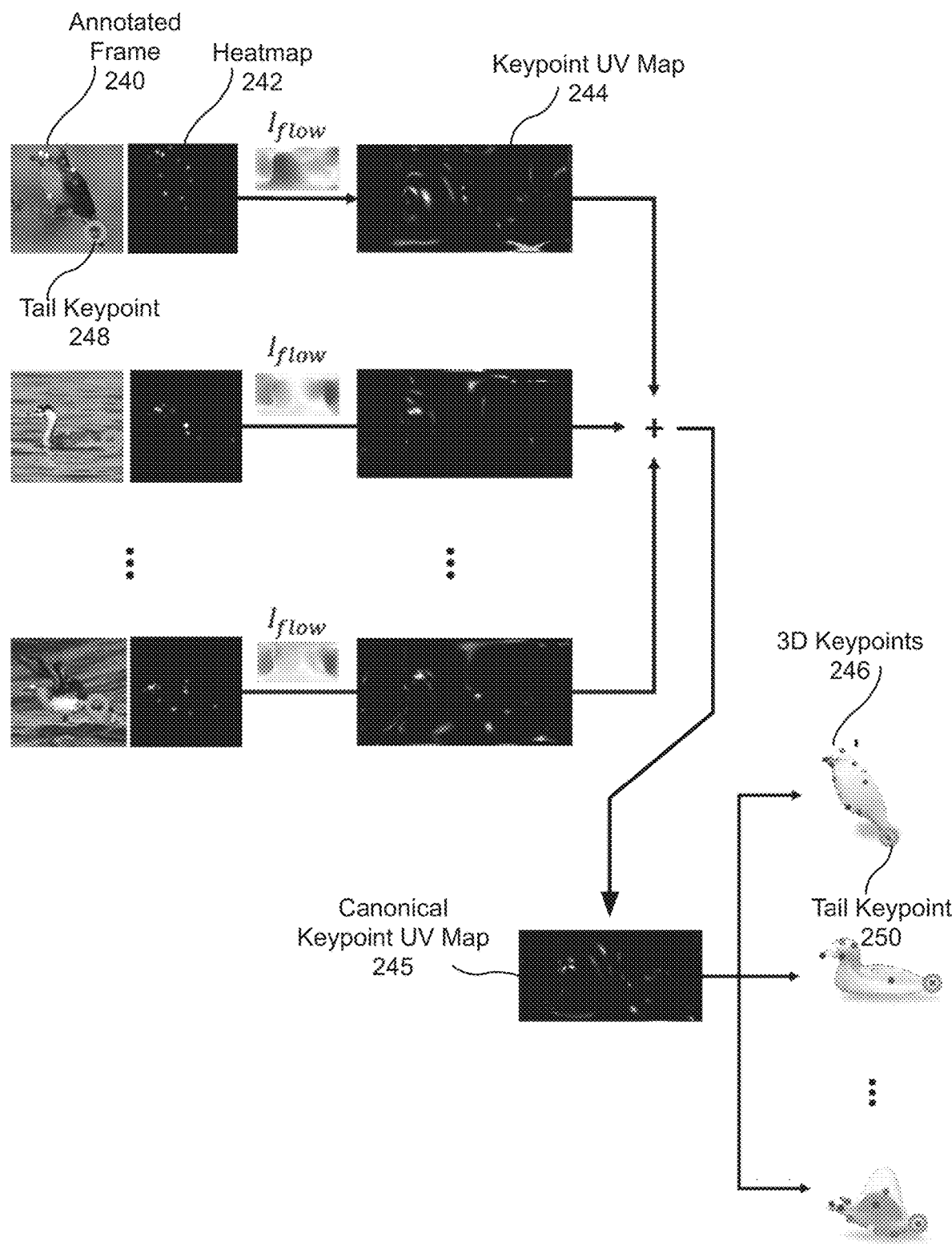
FIG. 2C illustrates a conceptual diagram of training using annotation re-projection suitable for use in implementing some embodiments of the present disclosure.

FIG. 2C illustrates a conceptual diagram of training using annotation re-projection, in accordance with an embodiment. Although the technique is described for annotations that are keypoints, those skilled in the art will recognize that other types of annotations may be used with the technique. When the 3D object construction system 100 is trained using weak supervision, 2D keypoints may be provided as ground truth annotations that semantically associate different instances of the object. For example, an annotated frame 240 includes multiple keypoints, such as a tail keypoint 248 at the tip of the bird's tail.

When the 2D keypoints are projected onto the 3D representation (e.g., mesh surface), the same semantic keypoint for different object instances should be matched to the same face on the mesh surface. Conventionally, to model the mapping between the 3D mesh surface and the 2D keypoints, an affinity matrix is learned that describes the probability of each 2D keypoint mapping to each vertex on the 3D representation. The probability map is a heatmap, such as heatmap 242.

The affinity matrix is shared among all instances and is independent of individual shape variations. The conventional approach is sub-optimal because: (i) Mesh vertices are a subset of discrete points on a continuous mesh surface and so their weighted combination defined by the affinity matrix may not lie on the mesh surface, leading to inaccurate mappings of 2D keypoints. (ii) The mapping from the image space to the mesh surface is described by the affinity matrix.

In contrast, because the mapping of image space the mesh surface is already modeled by the texture flow, it is potentially redundant to independently learn both the affinity matrix and the texture flow.

Therefore, the texture flow is re-utilized to map 2D keypoints from each image to the mesh surface. For example, the 2D tail keypoint 248 is mapped to a 3D tail keypoint 246 on the 3D representation. First, each 2D keypoint in an annotated frame is mapped to the UV texture space that is independent of shape deformation. For example, the keypoints in the annotated frame 240 may be mapped to the UV texture space according to the texture flow, $I_{flow}$ that is predicted for the annotated frame 240 to generate an annotation map in the texture space, keypoint UV map 244. Ideally, each semantic keypoint from different instances of the object should map to the same point in the UV space. In practice, this may not hold due to inaccurate texture flow prediction. To accurately map each keypoint to the UV space, a canonical keypoint UV map 245 may be computed by: (i) mapping the keypoint heat map for each instance to the UV space via the predicted texture flow, and (ii) aggregating the keypoint UV maps across all instances to eliminate outliers caused by incorrect texture flow prediction. The keypoint UV maps are aggregated (e.g., averaged) to produce the canonical keypoint UV map 245.

The canonical keypoint UV map 245 is then transferred to 3D shape representations predicted for the frames to produce annotated 3D shape representations. The annotated 3D shape representations may then be projected, according to associated camera poses, to produce projected annotations for the frames. In an embodiment, the projection comprises rendering. In an embodiment, the keypoint re-projection is done by (i) warping the canonical keypoint UV map to each individual predicted mesh surface to produce a 3D keypoint; (ii) projecting the 3D keypoints $K_{3D}^i$) back to the 2D space via the predicted camera pose to produce re-projected 2D keypoints; (iii) comparing the re-projected 2D keypoints against the ground truth keypoints in 2D, $K_{2D}^i$. For example, the canonical keypoint UV map 245 is mapped to the 3D representation to produce 3D keypoint 246, including the tail keypoint 250. The 3D keypoints 246 are re-projected according to the predicted camera pose and compared with the ground truth keypoints in the annotated frame 240. In an embodiment, parameters of the neural network model 150 are updated to reduce differences and encourage consistency between the projected keypoints and the ground truth keypoints.

Given the 3D correspondence (denoted as $K_{3D}^i$) of each 2D semantic keypoint $K_{2D}^i$, a keypoint re-projection loss enforces the projection of the former to be consistent with the latter by:

$$L_{kp} = \frac{1}{N_k} \sum_{i=1}^{N_k} \|\mathcal{R}(K_{3D}^i, \theta) - K_{2D}^i\|, \quad \text{Eq. (6)}$$

where $N_k$ is the number of keypoints. Evaluation of the keypoint re-projection loss function implicitly reveals the correctness of both the predicted shape and camera pose for the mesh reconstruction algorithm, especially for objects that do not have 3D ground truth annotations. The re-projection of annotations enables weakly supervised training of the 3D object construction system 100.

One bottleneck of conventional image-based 3D mesh reconstruction methods is that the predicted shapes are assumed to be symmetric. This assumption does not hold for most non-rigid animals, e.g., birds tilting their heads, or walking horses, etc. Therefore, the assumption of symmetry may be ignored and the reconstructed mesh representations may be allowed to fit more complex, non-rigid poses via an as-rigid-as-possible (ARAP) constraint. The ARAP constraint is an additional loss objective that may be used for self-supervised training of the 3D object construction system 100. The identity shape is smooth by construction. However, application of the offsets predicted by the motion decoder 120 may produce discontinuities in the 3D mesh representation. The ARAP constraint is used to ensure that edge lengths of the 3D mesh are maintained even when the 3D mesh is rotated. ARAP is a self-supervised regularization that maintains rigidity and can be used on individual input images and video sequences.

Without any pose-related regularization, the predicted motion deformation $\Delta V$ often leads to erroneous random deformations and spikes on the surface of the 3D mesh, which do not faithfully describe the motion of a non-rigid object. The ARAP constraint encourages rigidity of local transformations and the preservation of the local mesh structure. The ARAP constraint is formulated as an objective that ensures that the predicted shape V is a locally rigid transformation from the predicted base shape $V_{base}$ by:

$$L_{arap}(V_{base}, V) = \Sigma_{i=1}^{|V|} \Sigma_{j \in \mathcal{N}(i)} w_{ij} \|(V^i - V^j) - R_i(V_{base}^i - V_{base}^j)\|,$$ Eq. (7)

where $\mathcal{N}_{(i)}$ represents the neighboring vertices of a vertex i, $w_{ij}$ and $R_i$, are the cotangent weight and the best approximating rotation matrix, respectively. As another constraint that does not require any labels, ARAP may be enforced during test-time training with video inputs, to improve shape prediction.

In an embodiment, parameters of the neural network model 150 are updated based on the ARAP loss function $L_{arap}$ to reduce discontinuities in the predicted 3D shape representations. Non-rigid motion deformations of the 3D shape representations are predicted for the frames and applied to identity shapes predicted for the frames to produce the 3D shape representations of the object. The ARAP loss function may be evaluated based on rotated differences between the identity shapes and differences between the 3D shape representations.

In an embodiment, two image-based 3D object construction methods are used for training the neural network model 150 (i) a weakly supervised method (i.e., with object silhouettes and 2D annotations provided), and (ii) a self-supervised method where only object silhouettes are available. The image-based trained neural network model 150 is then adapted to videos. For example, in an embodiment, the trained neural network model 150 is adapted to videos that are in-the-wild bird and zebra videos.

Figure 2D:
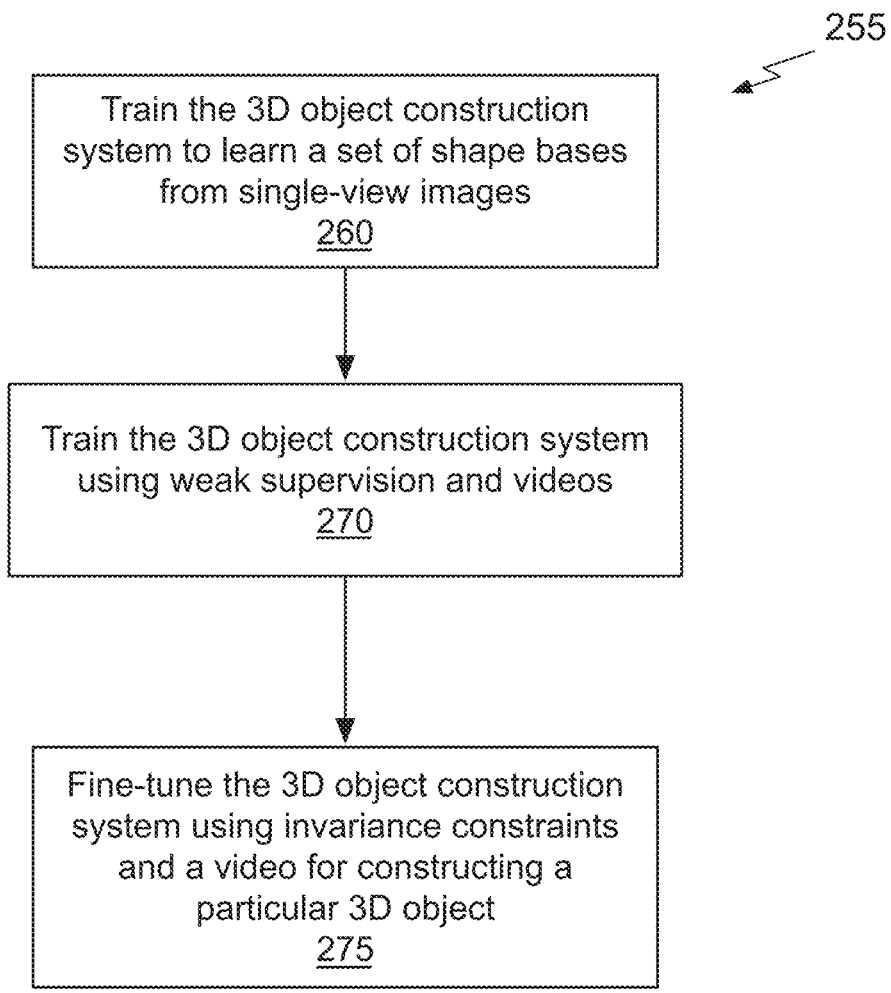
FIG. 2D illustrates a flowchart of a method for training the 3D object construction system shown in FIG. 1A suitable for use in implementing some embodiments of the present disclosure.

FIG. 2D illustrates a flowchart of a method 255 for training the 3D object construction system 100 shown in FIG. 1A, in accordance with an embodiment. At step 260, the 3D object construction system 100 is trained to learn a set of shape bases from single-view images. In an embodiment, objectives used individually or in combination for the single-view construction include (i) foreground mask loss: a negative intersection over union objective between rendered and ground truth silhouettes; (ii) foreground RGB texture loss: a perceptual metric between rendered and input RGB images; (iii) mesh smoothness: a Laplacian constraint to encourage smooth mesh reconstruction; (iv) keypoint reprojection loss; and (v) the ARAP constraint.

At step 270, the 3D object construction system 100 is trained using self-supervision for videos. Since it is feasible to predict a segmentation mask via a pretrained segmentation model, the predicted foreground mask may be used to compute the foreground mask loss. In an embodiment, objectives used individually or in combination for the for videos may include the foreground RGB texture loss, and the mesh smoothness objective. In an embodiment, the ARAP constraint may also be used.

At step 275, the 3D object construction system 100 is fine-tuned for constructing a particular 3D object using the one or more of the invariance constraints for texture, identity shape, and part correspondence.

Figure 3:
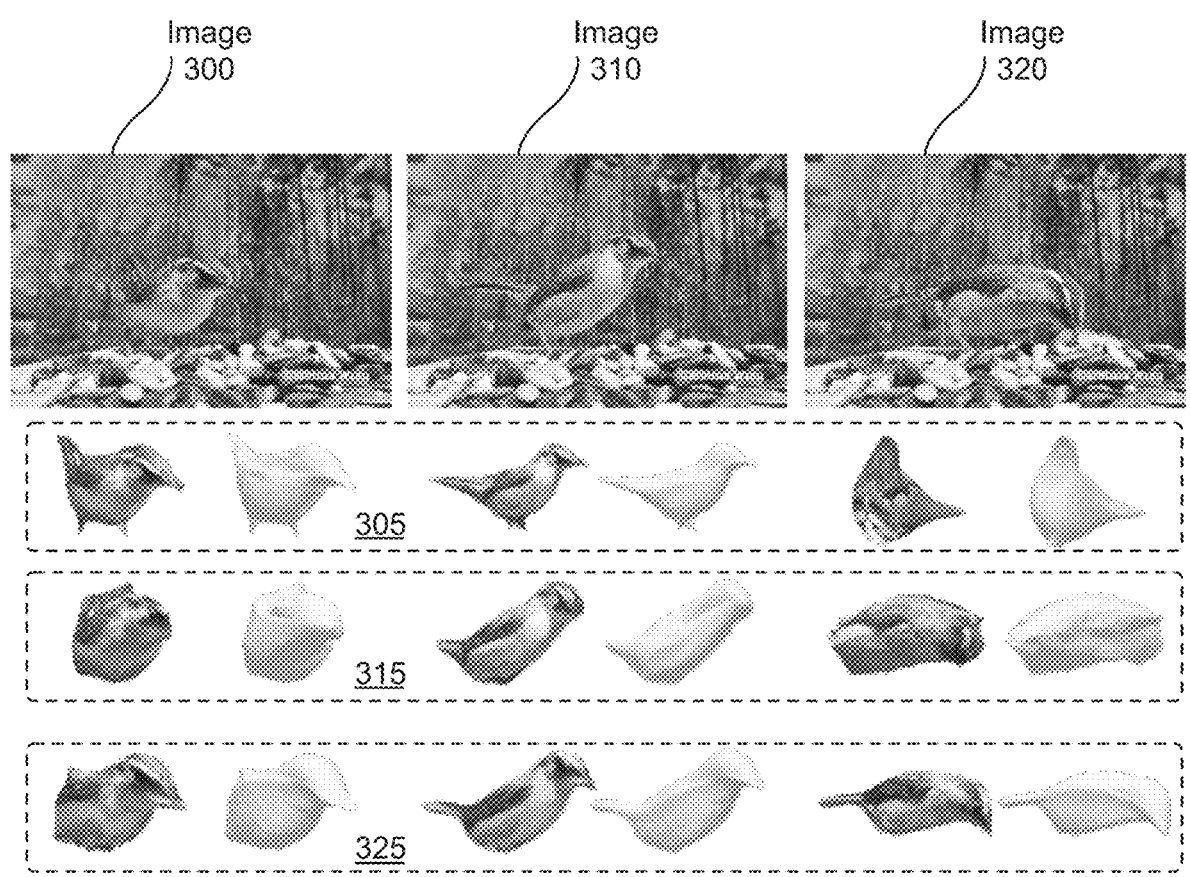
FIG. 3 illustrates images and reconstructed objects, in accordance with an embodiment.

FIG. 3 illustrates images and reconstructed objects, in accordance with an embodiment. The 2D bird object shown in images 300, 310, and 320 is constructed in 3D using the 3D object construction system 100 including the camera pose unit 225 trained on single-view images to produce the 3D representations and objects 305, trained on single view images and videos, but without invariance constraints, to produce the 3D representations and objects 315, and trained on single view images and videos with invariance constraints to produce the 3D representations and objects 325. Note that the object shape, camera pose, and texture is less reliably predicted for the 3D representations and objects 315 compared with 325. Similarly, the object shape, camera pose, and texture are less reliably predicted for the 3D representations and objects 305 compared with 315. In sum, the 3D object construction algorithm recovers temporally consistent and reliable 3D structures from videos of non-rigid objects including those of animals captured in the wild.

The 3D object construction technique does not require pre-defined template object meshes, annotations of a 3D object, 2D annotations, or camera pose for the video frames. The video-based 3D object construction system 100 may be refined via self-supervised online adaptation for any incoming test video. First, a category-specific 3D construction neural network model 150 is learned from a collection of single-view images of the same category. The 3D object construction system 100 jointly predicts the shape, texture, and camera pose of an object in an image. Then, at inference time, the neural network model is fine-tuned over time by an object-specific test video using self-supervised regularization terms that exploit temporal consistency of an object instance to enforce that all reconstructed meshes share a common texture map, a base shape, as well as parts.

The 3D object construction technique may be used for content creation, such as generation of 3D characters for games, movies, and 3D printing. Because the 3D characters are generated from video, the content may also include motion of the character, as predicted based on the video. Compared with conventional solutions, the 3D object construction technique does not rely on a pre-defined parametric mesh (e.g., human object defined by a fixed number of vertices). The 3D object construction system also generalizes well, particularly for non-rigid objects.

Parallel Processing Architecture

Figure 4:
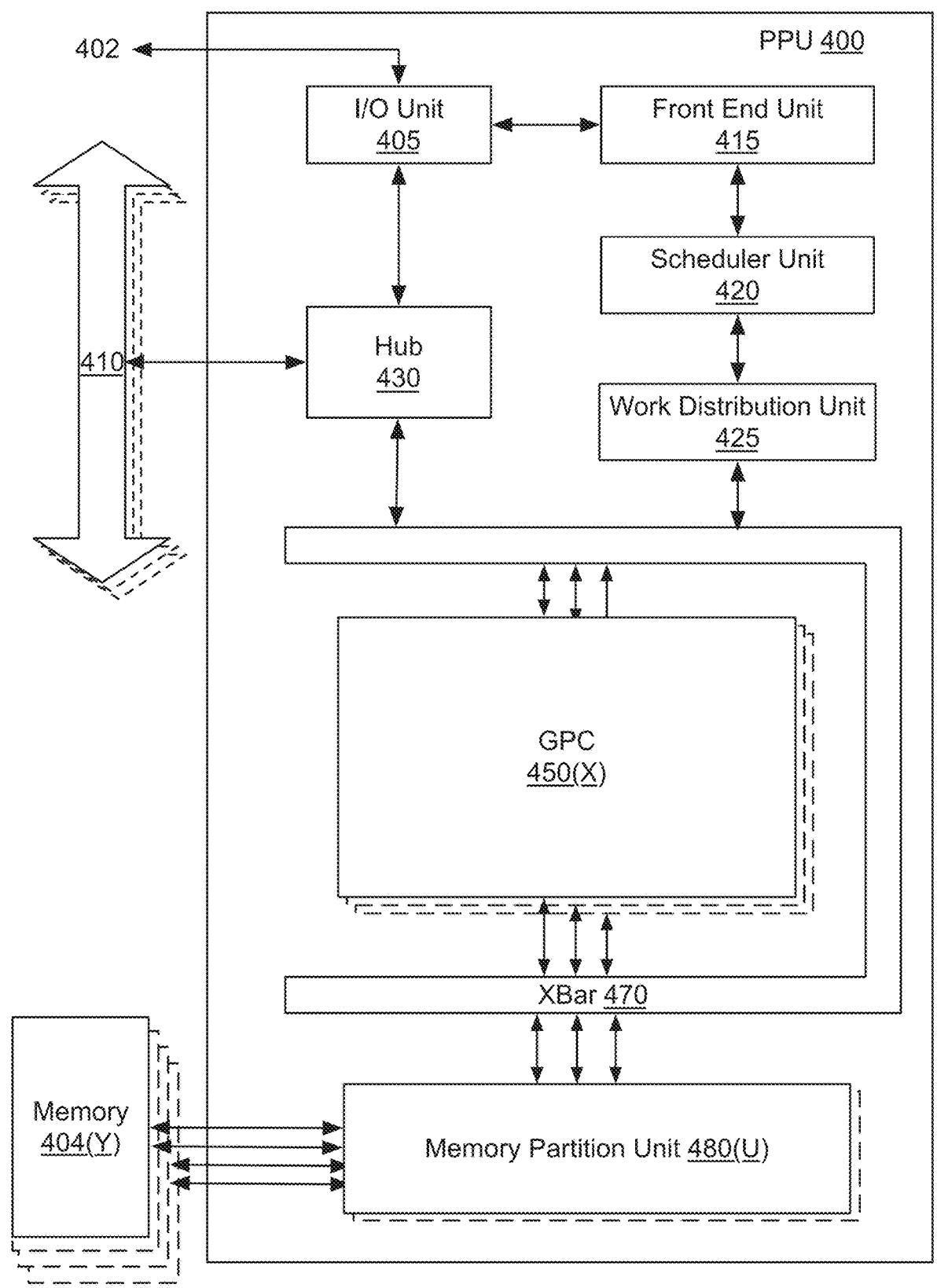
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the 3D object construction system 100. The PPU 400 may be used to implement one or more of the encoder 105, shape decoder 115, motion decoder 120, texture decoder 125, 3D mesh construction unit 130, and 3D mesh texture unit 122 within the server/client system 100.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 430 may each include, and/or be configured to perform functions of, one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
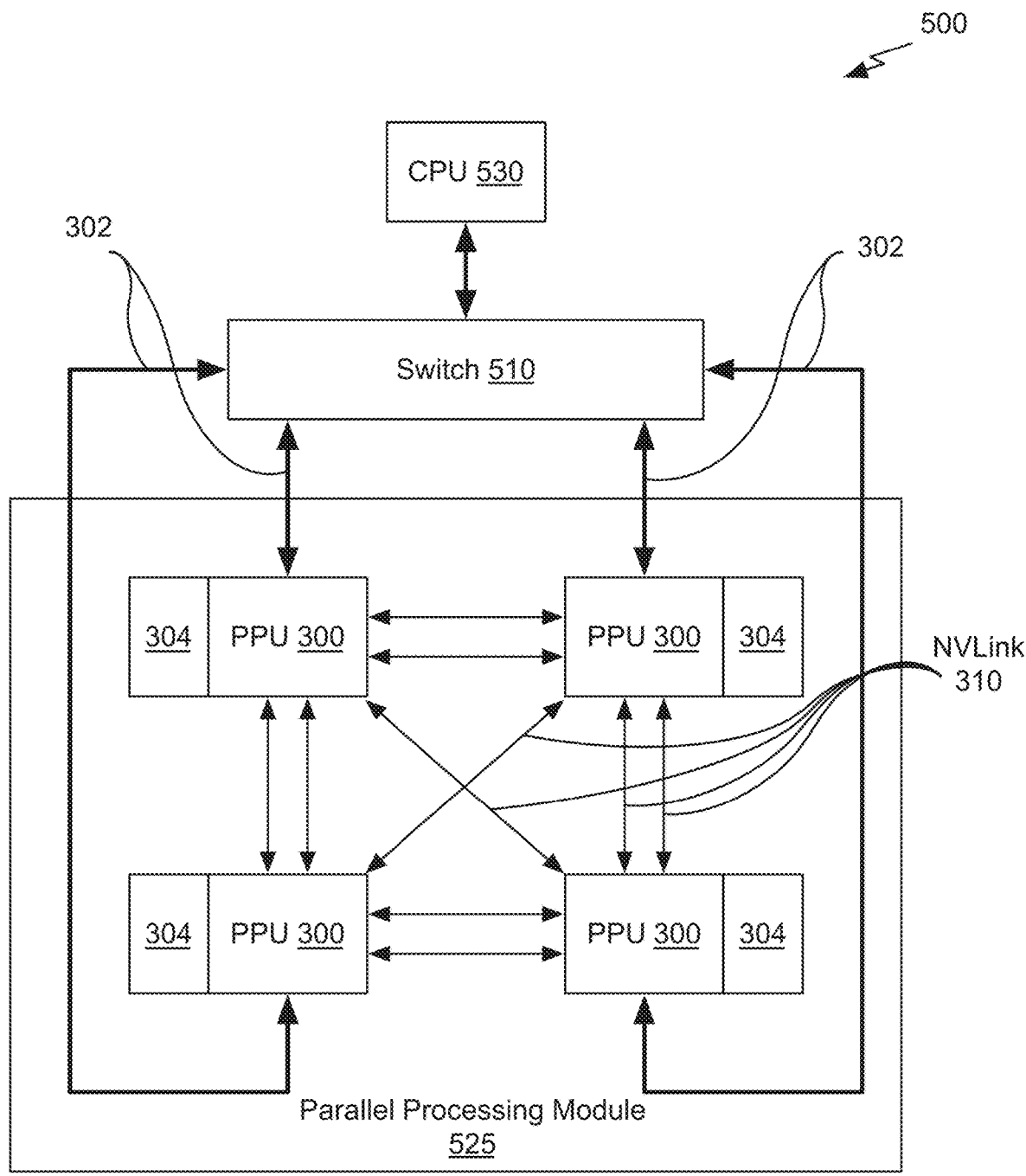
FIG. 5A is a conceptual diagram of a processing system implemented using the PPU of FIG. 4 suitable for use in implementing some embodiments of the present disclosure.

FIG. 5A is a conceptual diagram of a processing system 500 implemented using the PPU 400 of FIG. 3, in accordance with an embodiment. The exemplary system 565 may be configured to implement the method 130 shown in FIG. 1B, the method 148 shown in FIG. 1D, and/or the method 255 shown in FIG. 2D. The processing system 500 includes a CPU 530, switch 510, and multiple PPUs 400, and respective memories 404. The NVLink 410 provides high-speed communication links between each of the PPUs 400. Although a particular number of NVLink 410 and interconnect 402 connections are illustrated in FIG. 5A, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 302 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 300 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

Figure 5B:
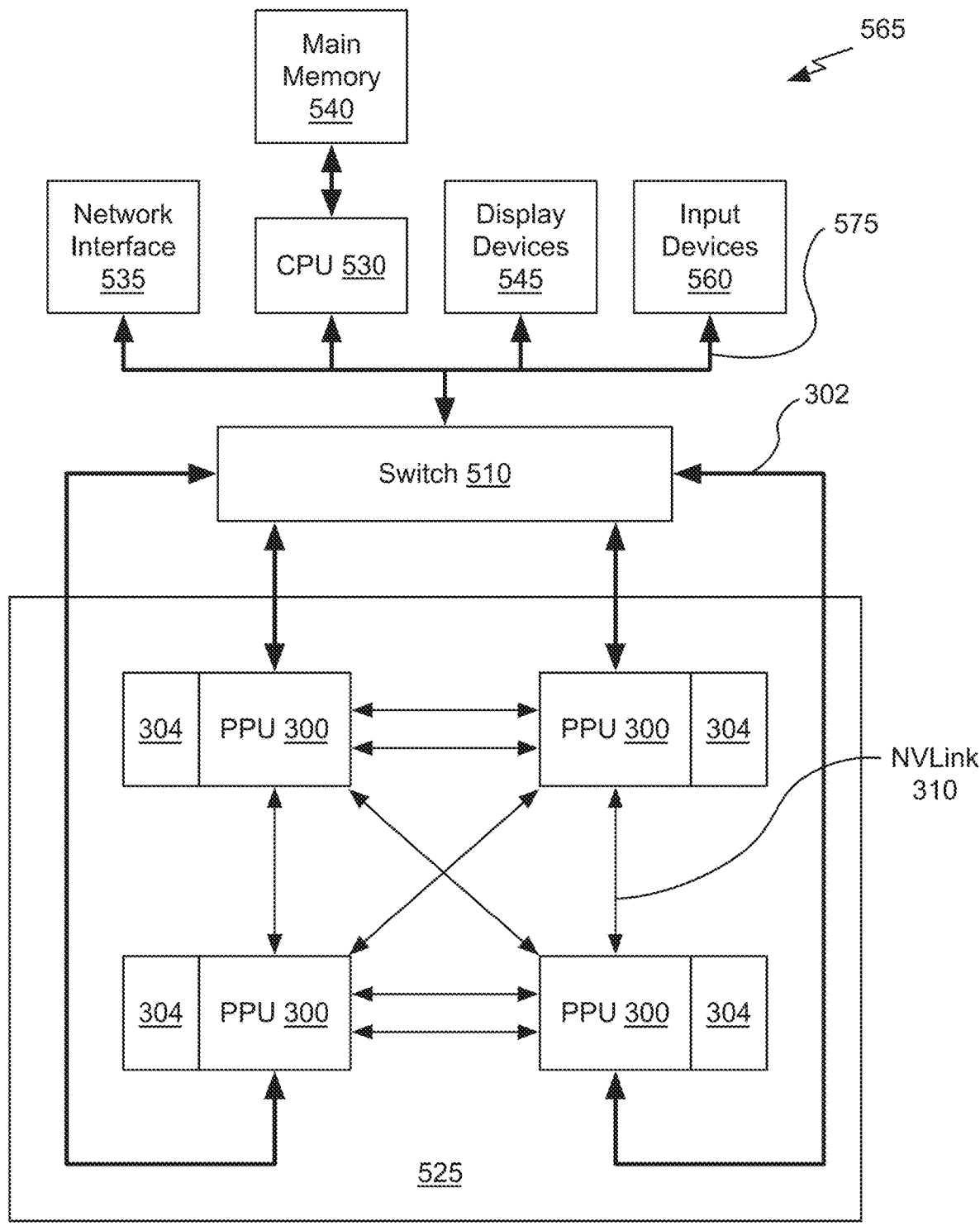
FIG. 5B illustrates an exemplary system in which the various architecture and/or functionality of the various previous embodiments may be implemented.

FIG. 5B illustrates an exemplary system 565 in which the various architecture and/or functionality of the various previous embodiments may be implemented. The exemplary system 565 may be configured to implement the method 130 shown in FIG. 1B, the method 148 shown in FIG. 1D, and/or the method 255 shown in FIG. 2D.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units of the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6A:
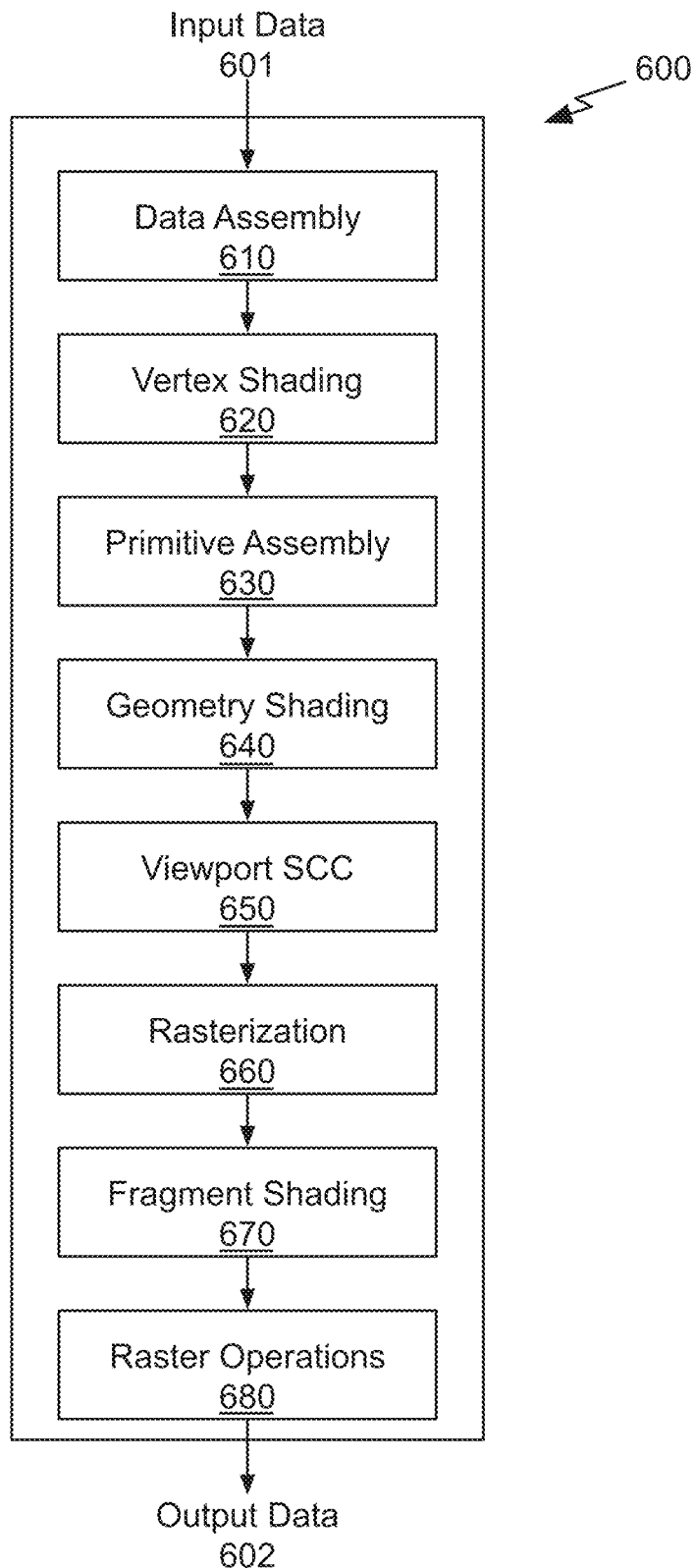
FIG. 6A is a conceptual diagram of a graphics processing pipeline implemented by the PPU of FIG. 4 suitable for use in implementing some embodiments of the present disclosure.

FIG. 6A is a conceptual diagram of a graphics processing pipeline 600 implemented by the PPU 400 of FIG. 4, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6A, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 400. Other stages of the graphics processing pipeline 600 may be implemented by programmable hardware units such as the processing unit within the PPU 400.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline 600 utilizing the hardware of the PPU 400.

Various programs may be executed within the PPU 400 in order to implement the various stages of the graphics processing pipeline 600. For example, the device driver may launch a kernel on the PPU 400 to perform the vertex shading stage 620 on one processing unit (or multiple processing units). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, in a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Game Streaming System

Figure 6B:
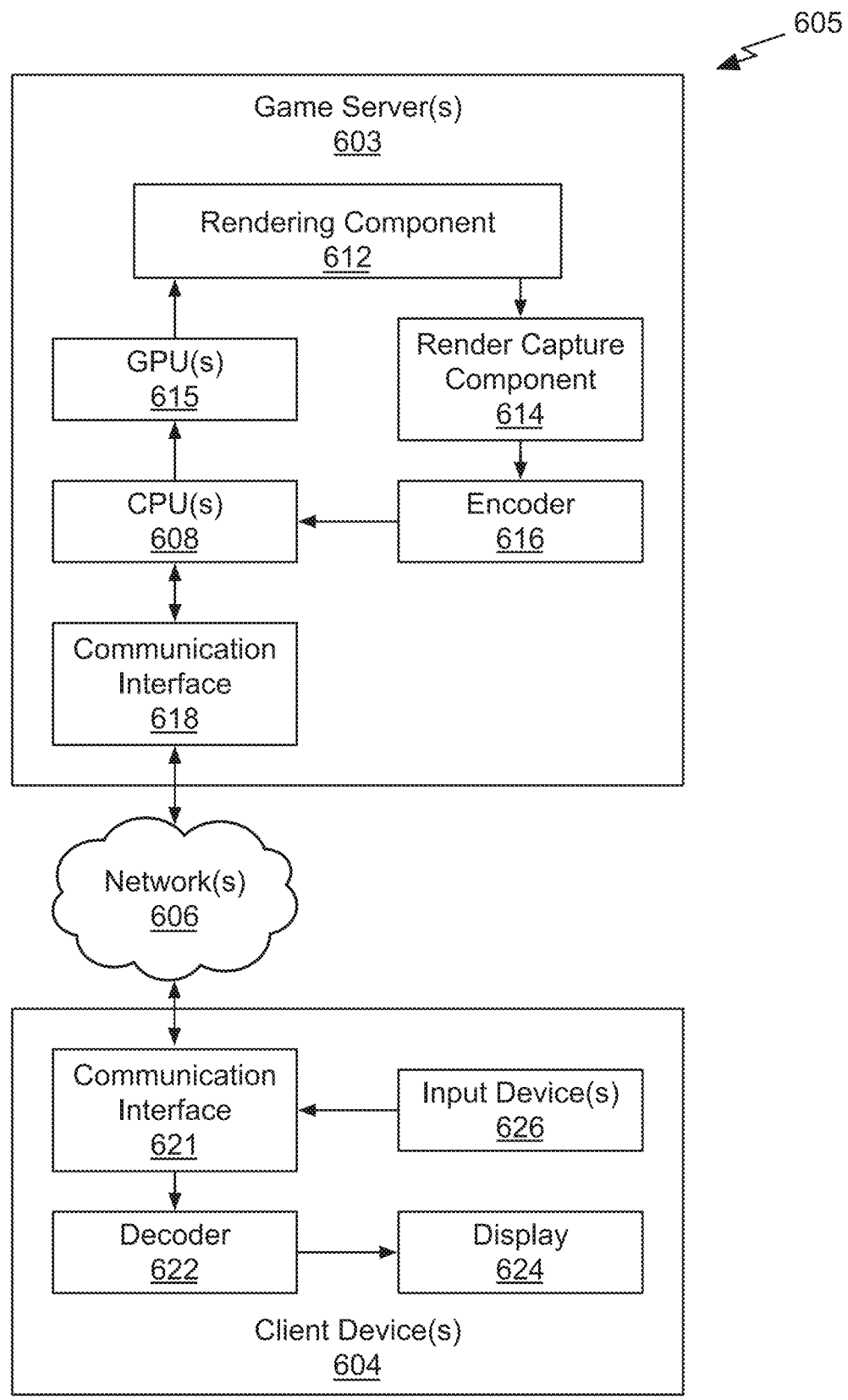
FIG. 6B illustrates an exemplary game streaming system suitable for use in implementing some embodiments of the present disclosure.

FIG. 6B is an example system diagram for a game streaming system 605, in accordance with some embodiments of the present disclosure. FIG. 6B includes game server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s) 626, transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) 615 of the game server(s) 603). In other words, the game session is streamed to the client device(s) 604 from the game server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) 626 and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs 615, which may further employ the use of one or more dedicated hardware accelerators or processing cores to perform ray or path-tracing techniques—of the game server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method for training a neural network model to construct a three-dimensional (3D) representation of an object from images of the object captured from different camera poses, comprising:
    mapping pixels from a first image of the images to a texture space according to a first texture flow to produce a first texture image, wherein transfer of the first texture image onto a first 3D shape representation constructs a first 3D object corresponding to the object in the first image;
    mapping pixels from a second image of the images to the texture space according to a second texture flow to produce a second texture image, wherein transfer of the second texture image onto a second 3D shape representation constructs a second 3D object corresponding to the object in the second image;
    evaluating a loss function based on swapping the first texture image and the second texture image to combine the second texture image with the first 3D shape representation and combine the first texture image with the second 3D shape representation; and
    updating parameters of the neural network model based on the loss function to encourage consistency between the first texture image and the second texture image.

2. The computer-implemented method of claim 1, further comprising:
    extracting features from a video including the images;

predicting the first 3D shape representation and the second 3D shape representation based on a set of learned shape bases and the features.

3. The computer-implemented method of claim 1, further comprising predicting, by a texture decoder portion of the neural network model, the first texture flow based on the features extracted from the first image.

4. The computer-implemented method of claim 1, further comprising:
predicting non-rigid motion deformations of the first 3D shape representation; and
applying the non-rigid motion deformations to an identity shape to produce the first 3D shape representation.

5. The computer-implemented method of claim 4, further comprising:
predicting second non-rigid motion deformations of the second 3D shape representation; and
applying the second non-rigid motion deformations to a second identity shape to produce the second 3D shape representation; and
evaluating a second loss function based on rotated differences between the identity shape and the second identity shape and differences between the first 3D shape representation and the second 3D shape representation.

6. The computer-implemented method of claim 1, further comprising updating the parameters of the neural network model to reduce discontinuities in the first 3D shape representation and the second 3D shape representation.

7. The computer-implemented method of claim 1, wherein the first 3D shape representation is a mesh of vertices that define faces.

8. The computer-implemented method of claim 1, wherein the neural network model is further configured to predict the camera poses.

9. The computer-implemented method of claim 1, further comprising:
projecting the first 3D object according to a first camera pose to produce a rendered image; and
updating the parameters of the neural network model to reduce differences between the rendered image and the first image.

10. The computer-implemented method of claim 1, wherein the images are each annotated and further comprising:
mapping the annotations into the texture space according to corresponding texture flows for the images to produce annotation maps in the texture space; and
aggregating the annotation maps to produce a canonical annotation map for the video.

11. The computer-implemented method of claim 1, wherein the object is animal or human character.

12. The computer-implemented method of claim 1, wherein at least one of the steps of mapping pixels from a first image, mapping pixels from a second image, evaluating, and updating is performed on a server in a data center, or in a cloud-based computing environment to construct the object, and the object is streamed to a user device.

13. The computer-implemented method of claim 1, wherein at least one of the steps of mapping pixels from a first image, mapping pixels from a second image, evaluating, and updating is performed to generate the object that is used for training, testing, or certifying a second neural network that is employed in a machine, robot, or autonomous vehicle.

14. A system, comprising:
a neural network model that is trained to construct a three-dimensional (3D) representation of an object from images of the object captured from different camera poses by:
mapping pixels from a first image of the images to a texture space according to a first texture flow to produce a first texture image, wherein transfer of the first texture image onto a first 3D shape representation constructs a first 3D object corresponding to the object in the first image;
mapping pixels from a second image of the images to the texture space according to a second texture flow to produce a second texture image, wherein transfer of the second texture image onto a second 3D shape representation constructs a second 3D object corresponding to the object in the second image;
evaluating a loss function based on swapping the first texture image and the second texture image to combine the second texture image with the first 3D shape representation and combine the first texture image with the second 3D shape representation; and
updating parameters of the neural network model based on the loss function to encourage consistency between the first texture image and the second texture image.

15. The system of claim 14, wherein the neural network model is configured to:
extract features from a video including the images;
predict the first 3D shape representation and the second 3D shape representation based on a set of learned shape bases and the features.

16. The system of claim 14, further comprising updating the parameters of the neural network model to reduce discontinuities in the first 3D shape representation and the second 3D shape representation.

17. The system of claim 14, wherein the neural network model is further configured to predict the camera poses.

18. The system of claim 14, wherein the object is animal or human character.

19. A non-transitory computer-readable media storing computer instructions for training a neural network model to construct a three-dimensional (3D) representation of an object from images of the object captured from different camera poses that, when executed by one or more processors, cause the one or more processors to perform the steps of:
mapping pixels from a first image of the images to a texture space according to a first texture flow to produce a first texture image, wherein transfer of the first texture image onto a first 3D shape representation constructs a first 3D object corresponding to the object in the first image;
mapping pixels from a second image of the images to the texture space according to a second texture flow to produce a second texture image, wherein transfer of the second texture image onto a second 3D shape representation constructs a second 3D object corresponding to the object in the second image;
evaluating a loss function based on swapping the first texture image and the second texture image to combine the second texture image with the first 3D shape representation and combine the first texture image with the second 3D shape representation; and
updating parameters of the neural network model based on the loss function to encourage consistency between the first texture image and the second texture image.

20. The non-transitory computer-readable media of claim 19, wherein the object is animal or human character.

\* \* \* \* \*